Figure 6:
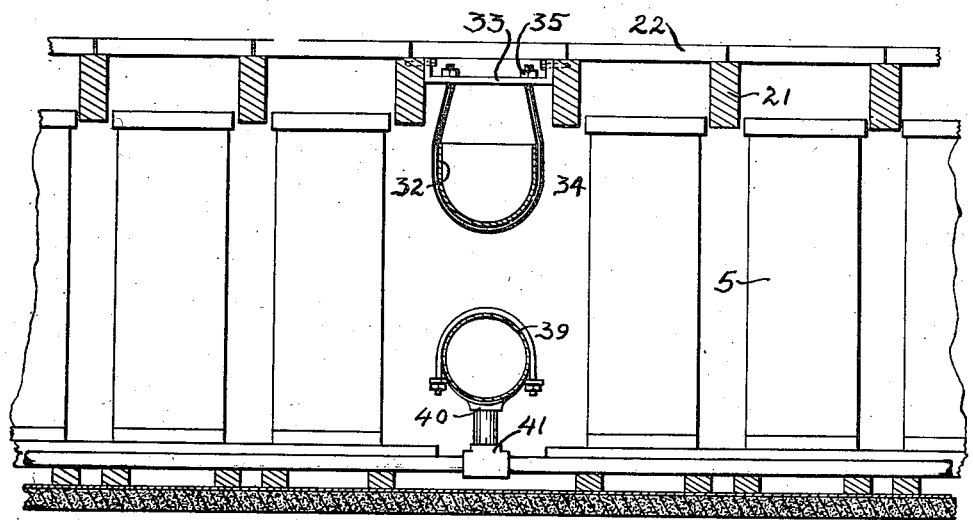

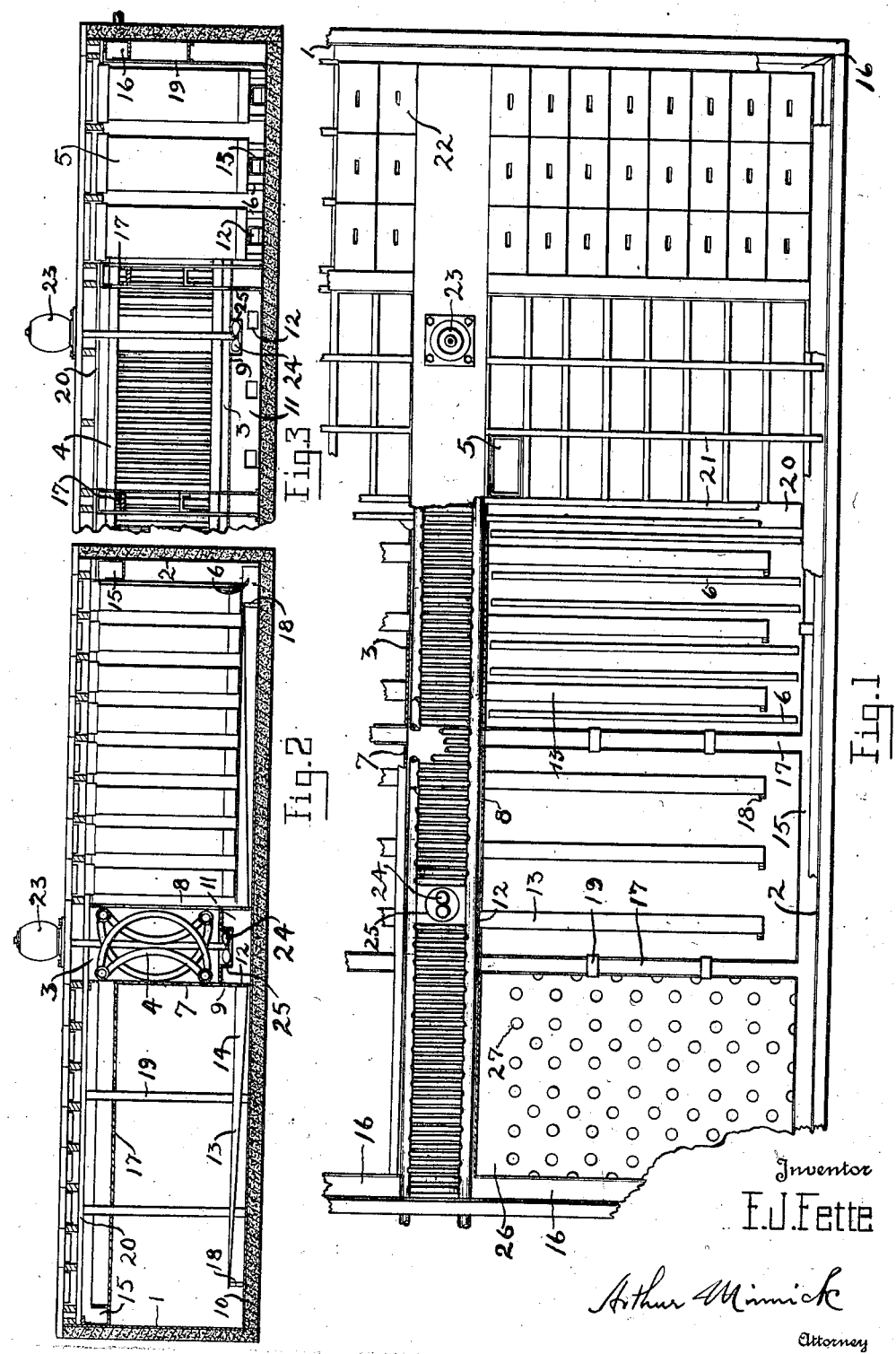

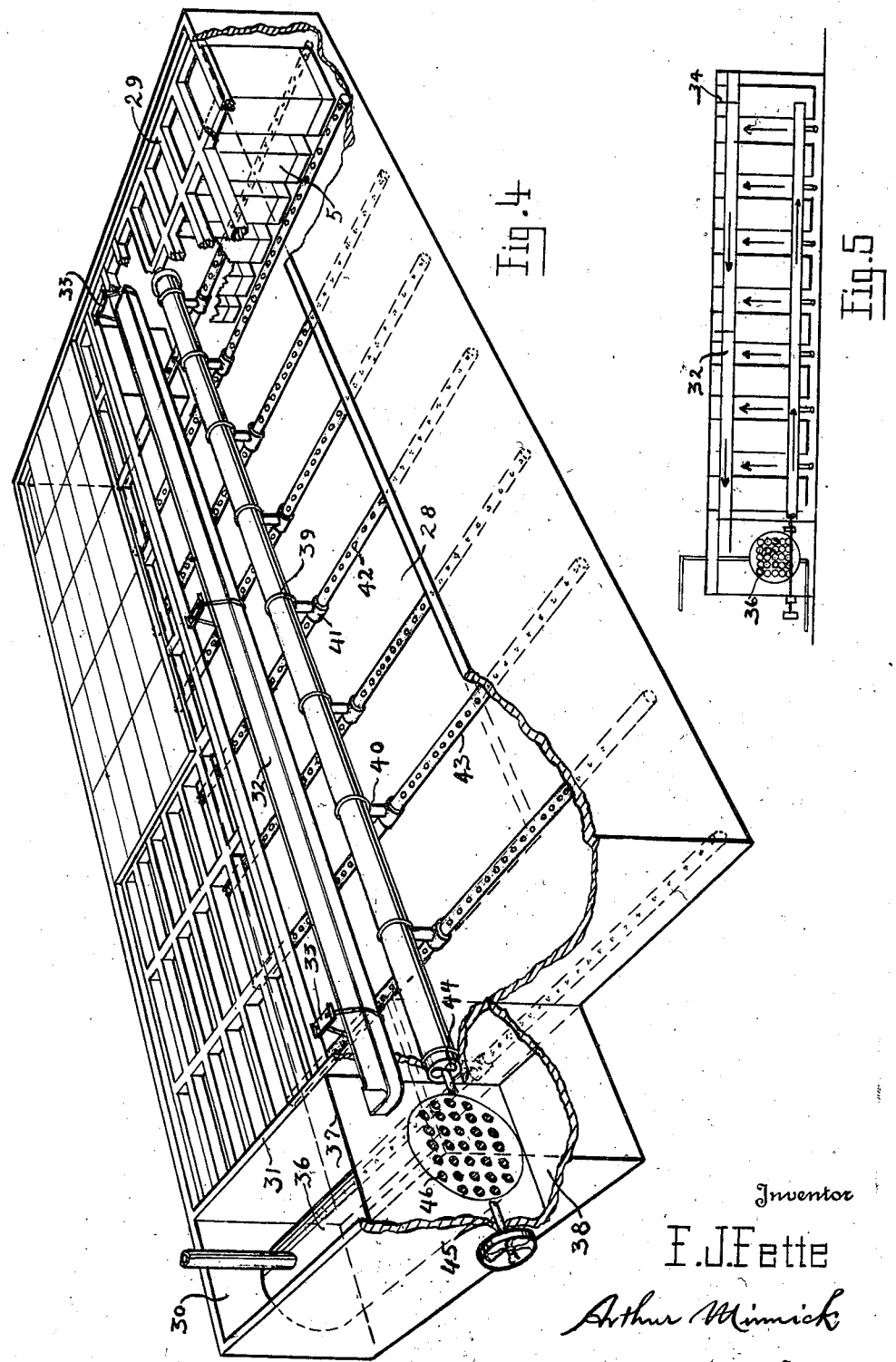

Patented Jan. 12, 1943

2,308,164

UNITED STATES PATENT OFFICE 2,308,164

ICE MAKING APPARATUS

Frank J. Fette, Tampa, Fla.

Application August 8, 1940, Serial No. 351,822

4 Claims. (Cl. 62—160)

This invention relates to apparatus for making ice wherein a heat-absorbing liquid, such as brine, is brought into contact with the outer surfaces of containers for water after the brine has been reduced in temperature below the freezing point of water, by passing through a heat-exchange device such as an evaporator for anhydrous liquid ammonia.

The primary object of the invention is to insure a more efficient circulation of the freezing brine both as regards contact with the water containers and contact with the cooling surfaces of the evaporator. To this end, in the present system, the freezing brine, starting at its lowermost temperature at the bottom of the freezing tank or tanks, circulates upward substantially vertically on all sides of each of the water containers, and this brine having reached its highest temperature by taking up heat because of this flow past the relatively warm containers, is skimmed off the surface by flowing into troughs which discharge upon the top of the evaporator coils throughout their entire length. Pumps or propellers drive the cold brine outward from the bottom of the evaporator chamber so that the flow is downward around the coils.

The warmest brine thus coming directly into contact with the heat-transfer surfaces of the evaporator, causes the most rapid evaporation of the liquid ammonia, thereby producing a higher back pressure, which in turn means the highest efficiency of the ammonia compressor.

The upward circulation of the brine around the containers is in the natural direction of flow of a warmed liquid, and the downward flow of the brine in the evaporator is in the natural direction of flow of a cooling liquid. Gravitation assists the flow in each case.

The brine at its coldest flows outward from the evaporator chamber through a distributor having a plurality of outlets close to the bottom of the tank and is of substantially the same temperature over the entire bottom of the tank. As it rises upward along the sides of the containers, every container is subjected to the cooling action of the brine at its lowest temperature, and the loss of heat will thus take place at the highest rate.

Under the usual arrangement at the present time, brine is caused to flow horizontally from one end of the freezing tank to the other, absorbing heat on its way and thus becoming warmer and less efficient as a cooling medium in its course from inlet to outlet. The first containers freeze rapidly but the last ones much more slowly. Under the present system, the freezing is uniformly rapid at every container because the brine is at the same temperature at every one.

Under the usual system, the warm brine from the tank is caused to flow horizontally lengthwise of the coils of the evaporator, giving up its heat rapidly only to the first half or two thirds of the refrigerant, and thereafter being too cool to lose much more heat during the rest of its travel. Thus a large portion of the refrigerant coil is inefficient and substantially idle. In the present system, the only brine that can reach the coils is the portion that has reached the top, the fraction that is at the highest temperature. The coils are active throughout their length from the top to the bottom.

Figure 7:
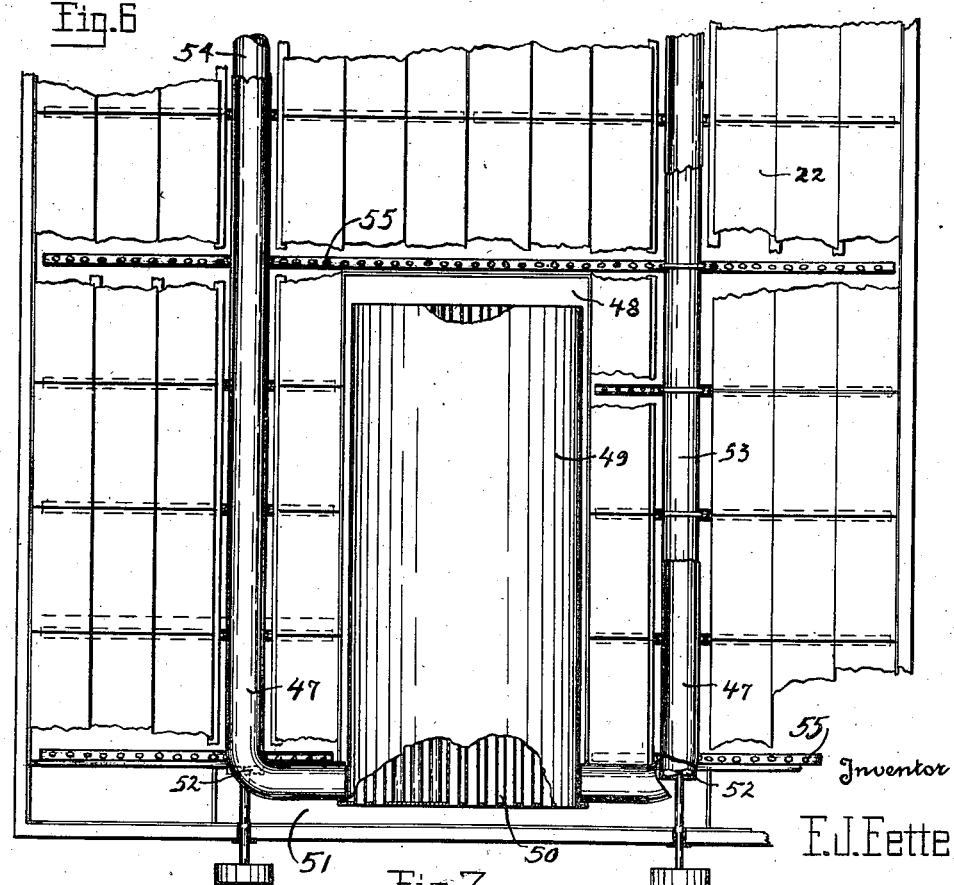

In the accompanying drawings, Figure 1 is a plan view of a preferred embodiment of the invention which has been proved to be highly efficient, parts being omitted and broken away; Fig. 2 is a transverse vertical section through two freezing tanks and an intermediate evaporator chamber; Fig. 3 is a longitudinal vertical section through a portion of the evaporator chamber with certain water containers shown in elevation in the freezing tank; Fig. 4 is a perspective view of a freezing tank of a modified form in which the evaporator is in a distinct compartment at one end of the tank; Fig. 5 is a longitudinal diagrammatic view to indicate the direction of flow of the brine in Fig. 4; Fig. 6 is a fragmentary cross section transverse to the main brine conduit and to the central skimmer trough of Fig. 4; and Fig. 7 is a fragmentary plan view with parts in section of a further modification of the invention.

In Figs. 1, 2, and 3, freezing tanks 1 and 2 are shown on opposite sides of an evaporator chamber 3 having therein the trunk coils 4 of the ammonia evaporator in which each pipe is flooded with liquid ammonia to the proper working level. The tanks 1 and 2 have the usual top of joist construction leaving spaces between joists through which water containers 5 may be lowered into or raised out of the tank.

On the bottom of the tanks are stringers 6 on which the lower ends of the containers rest so that they are held off the tank bottom to permit free circulation beneath the containers in contact with the bottoms of the containers as well as up around all four sides. As is the usual practice in the art, these containers are not quite filled with pure water, since the level of the top of the brine is, of course, below the level of the top of the containers. After remaining in the brine until the water has become frozen, the containers are lifted out progressively and the cakes of ice removed, then after recharging with a predetermined amount of fresh water, the containers are reimmersed in the brine to repeat the freezing operation.

The evaporator chamber 3 has side walls 7 and 8 and a horizontal partition 9 elevated above the tank bottom 10 to form a flume or distributor passage 11. Along both sides of this passage, rectangular ports 12 are cut through the walls 7 and 8, and extending laterally from each port is an inverted trough 13 having sides 14 which taper from the bottom upward toward their outer ends. Brine rushing out of the passage 11 into and along these troughs will spill out beneath the tapering sides and will move upward on all sides of the containers 5.

It will be observed in Fig. 1 that the containers are arranged in a plurality of groups three in width by eight in length and that a trough 13 lies beneath each row of eight. Around the outside and end walls of the tanks 1 and 2 are skimmer troughs 15 and 16 having level tops about an inch below the normal level of the brine in the tanks during operation and several inches below the tops of the containers. Between the groups of containers are intermediate skimmer troughs 17 having their tops on a common level with those of the side and end troughs. These troughs 17 extend between and connect the side troughs 15 with the top of the evaporator chamber 3 to convey the warm brine that flows into the side troughs across the tank to the chamber 3.

In the construction shown in Figs. 1, 2, and 3, the troughs 13 have their outer ends supported by metallic straps 18 welded to the troughs and to the floor. Vertical iron straps 19 are welded to the sides of the skimmer troughs 15, 16, and 17 and at their upper ends, these straps act as supports for the planks 20 which carry the joists 21 between the containers. The usual covers 22 resting on the joists 21 are provided to shut in the containers and to form a floor for the operator.

Electric motors 23 drive propellers 24 set within cylindrical discharge ports 25 in the partition 9. The freezing brine is thus driven by these propellers out of the bottom of the chamber 3, lengthwise of the flume 11, out of the ports 12 and along the troughs 13 where it is quite uniformly distributed among the containers around which it rises to the top and to the skimmers. As it is forced above the level of the tops of the skimmer troughs, the top inch overflows and rushes into the top of the chamber 3 where it swirls among the ammonia evaporator coils and loses its heat to the liquid ammonia on its rapid course to the outlets 25.

The evaporator and compressor may be of any preferred form and may be operated in any suitable manner.

As a modified construction, instead of the troughs 13, a false floor 26 is shown at the left in Fig. 1, with perforations 27 through which the brine may rise around the containers.

In cases where it may be desired to use a tubular cooler, a modification shown in Figs. 4, 5 and 6 may be adopted. The freezing compartment 28 has the usual framework 29 arranged for containers 5 and the cooling compartment 30 is distinct and separated from the main tank by a wall 31. The skimmer trough 32 runs longitudinally of the center of the tank and is carried by hanger bars 33 on which U-shaped hangers 34 are vertically adjustable by means of nuts 35 which can pull the hangers up or let them down to maintain the top at a desired level. While only three such hangers are shown, as many will be used as may be found necessary. The trough 32 discharges at one end into the top of the compartment 30; the other end is closed.

The tubular cooler 36 has its discharge end mounted in a partition 37 which separates the compartment 30 from a chamber 38, from the side wall of which extends a header or distributor passage 39 that runs the whole length of the freezing compartment 28 in a space provided by omitting a central longitudinal row of containers. Secured to this header, saddle connections 40 extend downward to connect by T's 41 with lateral branches 42 which extend outward between rows of tanks, and at the ends of the last rows, nearly to the sides of the compartment 28. The ends of these branches will be closed, but the brine will escape upward through perforations 43 cut to provide substantially equal flow at all points. A propeller 44 on a shaft 45 at the entrance to the header 39 forces the brine out of the chamber 38 through the header and out through the laterals. The brine flows upward on all sides of the containers and is skimmed off the top by the trough 32. The warm brine flows from the discharge end of the trough lengthwise of the outside of the cooler 36 and back through the tubes 46 of the cooler to the chamber 38 and out from this chamber into the header 39 to complete the cycle.

In Fig. 7, two skimmer troughs 47 discharge into a cooler compartment 48 having a tubular cooler 49 therein. The brine flows lengthwise of the outside of the cooler as in the previous case and returns through the tubes 50 of the cooler to a chamber 51 from which propellers 52 drive the brine into two headers 53, 54, each having lateral branches extending outward between rows of water containers. The operation of this modification is similar in every respect with that of the modification just previously described, the use of two skimmer troughs shortening the distance the warm brine on the surface must flow to reach a skimmer.

Many other variations in details of construction and in the number and arrangement of parts may be made by those skilled in the art without departing from the principles of the invention as claimed.

I claim:

1. In ice-making apparatus, a freezing compartment, a plurality of containers for water to be frozen in said compartment in a plurality of groups, a distributor passage extending along the lower part of the compartment between groups of containers, branches from the distributor passage leading under the containers, a trough extending along the upper part of said compartment between groups of containers, a cooling compartment into the top of which said trough discharges, and means for forcing a circulating heat absorbing medium from said cooling compartment into said distributor passage.

2. In ice making apparatus, a freezing tank, a plurality of containers for water to be frozen in said tank in a plurality of groups, a heat absorbing liquid medium surrounding the containers, a cooling compartment having an evaporator for a liquefied gas therein, a trough extending between groups of containers within the upper portion of the liquid medium and having its top below the surface of the liquid, said trough discharging warmed liquid upon the top of the evaporator, and means for withdrawing cooled liquid from the bottom of the cooling compartment and discharging it below the containers, whereby the circulation of the liquid medium is upward around the containers and downward around the evaporator.

3. In ice-making apparatus, a freezing tank, an evaporator chamber, a plurality of containers for water to be frozen within the tank in a plurality of groups, a heat absorbing liquid medium surrounding the containers, a plurality of troughs having their tops below the surface of the liquid medium each in a space between groups of containers and discharging into the upper portion of the evaporator chamber, an evaporator for liquefied gas extending longitudinally of the tank within the evaporator chamber, a passage beneath the evaporator chamber, and means for forcing the liquid medium out of the bottom of the evaporator chamber into the passage and laterally therefrom beneath the containers.

4. In ice-making apparatus, a freezing tank, a plurality of containers for water to be frozen in said tank, a heat absorbing liquid medium surrounding the containers, a cooling compartment having therein an evaporator for a liquefied gas, a distributor passage extending longitudinally of the freezing compartment and having branches extending laterally beneath the containers, a plurality of troughs between the containers and having their tops below the surface of the liquid medium in the freezing compartment and discharging the warmed liquid into the upper portion of the cooling compartment, and means for forcing the liquid medium out of the bottom of the cooling compartment into the distributor passage and out through the branches, whereby the circulation of the liquid medium is upward around the containers and downward around the evaporator.

FRANK J. FETTE.